United States Patent
Wallis et al.

(10) Patent No.: US 8,903,694 B2
(45) Date of Patent: Dec. 2, 2014

(54) SYSTEM AND METHOD FOR PERFORMING RESERVOIR SIMULATION USING PRECONDITIONING

(75) Inventors: John R. Wallis, Sugar Land, TX (US); Gary K. Li, Katy, TX (US); Gareth Shaw, Sutton Courtenay (GB)

(73) Assignees: Chevron U.S.A. Inc., San Ramon, CA (US); Schlumberger Technology Corporation, Houston, TX (US)

( * ) Notice: Subject to any disclaimer, the term of this patent is extended or adjusted under 35 U.S.C. 154(b) by 363 days.

(21) Appl. No.: 13/404,072

(22) Filed: Feb. 24, 2012

(65) Prior Publication Data

US 2012/0221303 A1 Aug. 30, 2012

Related U.S. Application Data

(60) Provisional application No. 61/446,333, filed on Feb. 24, 2011.

(51) Int. Cl.
  *G06G 7/50* (2006.01)
  *G06F 17/12* (2006.01)
  *G06F 17/50* (2006.01)

(52) U.S. Cl.
  CPC .......... *G06F 17/12* (2013.01); *G06F 17/5009* (2013.01); *G06F 2217/16* (2013.01)
  USPC ..................................... 703/9; 703/2; 703/10

(58) Field of Classification Search
  USPC .................................................. 703/2, 9, 10
  See application file for complete search history.

(56) References Cited

U.S. PATENT DOCUMENTS

| 6,662,146 B1 | 12/2003 | Watts |
| 7,516,056 B2 | 4/2009 | Wallis et al. |
| 2004/0186599 A1 | 9/2004 | Ahmed et al. |
| 2006/0235667 A1* | 10/2006 | Fung et al. ............ 703/10 |
| 2010/0082142 A1 | 4/2010 | Usadi |

FOREIGN PATENT DOCUMENTS

| WO | WO 0075854 | 12/2000 |
| WO | WO 0140937 | 6/2001 |

OTHER PUBLICATIONS

PCT International Search Report and Written Opinion of the International Searching Authority, dated Nov. 30, 2012, regarding PCT/US2012/026555 (7 pages).
*Crout Versions of the ILU Factorization With Pivoting for Sparse Symmetric Matrices*, Report UMSI-2004-044, Minnesota Supercomputer Institute, University of Minnesota, Minneapolis, MN, 2004.
Aziz, K. and Settari, A., *Petroleum Reservoir Simulation*, Applied Science Publishers Ltd., 1979, 58 pages.
Coates, K.H., *A Note on IMPES and Some IMPES-Based Simulation Models*, SPE 65092-PA, SPE Journal 5 (3), Sep. 2000, 7 pages.

(Continued)

*Primary Examiner* — Saif Alhija (57) ABSTRACT

A computer-implemented system, method, and software are provided for solving linear systems of equations arising in reservoir simulation. A linear system of fluid flow equations, including a plurality of unknown variables, is provided that represents fluid flow properties in a geological formation of a subterranean reservoir. Block diagonal scaling is applied to the linear system of fluid flow equations. Threshold incomplete lower-upper approximate factorization is applied to obtain a preconditioning matrix, which can be used to iteratively solve unknown variables associated with the system of fluid flow equations. Preconditioning can be used directly as part of a preconditioned Krylov subspace method or alternatively as a $2^{nd}$ stage preconditioner in a CPR algorithm.

20 Claims, 2 Drawing Sheets

(56) References Cited

OTHER PUBLICATIONS

Coates, K.H., *IMPES Stability: Selection of Stable Timesteps*, SPE 84924-PA, SPE Journal, Jun. 2003, 7 pages.

Cuthill, E., *Several Strategies for Reducing the Bandwidth of Matrices*, Sparse Matrices and their Applications, D.J. Rose and R.A. Willoughby, eds., Plenum Press, New York, 1972, pp. 157-166.

George, J.A., *A Survey of Sparse Matrix Methods in the Direct Solution of Finite Element Equations*, Proc. Summer Computer Simulation Conf., Montreal, Canada, Jul. 17-19, 1973, pp. 15-20.

Knight, P.A., *The Sinkhorn-Knopp Algorithm: Convergence and Applications*, Siam J. Matrix Analysis and Applications, 30, Issue 1, 2008.

Peaceman, D., *Fundamentals of Numerical Reservoir Simulation*, Elsevier Scientific Publishing Company, 1977, 39 pages.

Ruiz, D., *A scaling Algorithm to Equilibrate Both Row and Column Norms in Matrices*, Tech. Rep. RAL-TR-2001-034, Rutherford Appleton Laboratory, 2001.

Saad, Y. and Schultz, M.H., *GMRES: A Generalized Minimal Residual Algorithm for Solving Nonsymmetric Linear Systems*, SIAM J. Sci. Stat. Comput., 7:856-869, 1986.

Saad, Y., *Multilevel ILU With Reorderings for Diagonal Dominance*, SIAM J. Sci. Comput., 27:1032-1057, 2006.

Saad, Y., *ILUT: A Dual Threshold Incomplete ILU Factorization*, Numerical Linear Algebra with Applications, vol. 1, No. 4, pp. 387-402, 1994.

Stone, H.L., Garder, Jr., A.O., *Analysis of Gas-Cap or Dissolved-Gas Drive Reservoirs*, SPE 1518-G, Society of Petroleum Engineers Journal, Jun. 1961, 13 pages.

Thomas, G.W., Thurnau, D.H., *Reservoir Simulation Using an Adaptive Implicit Method*, SPE 10120, Society of Petroleum Engineers of AIME, Oct. 1983, 10 pages.

Van Der Vorst, H., *Bi-CGSTAB: A Fast and Smoothly Converging Variant of Bi-CG for the Solution of Nonsymmetric Linear Systems*, SIAM J. Sci. Statist. Comput. 13:631-644, 1992.

Vinsome, P.K.W., *Orthomin, An Iterative Method for Solving Sparse Sets of Simultaneous Linear Equations*, in Proc. Fourth Symposium on Reservoir Simulation, Society of Petroleum Engineers of AIME, (1976), 149-159, SPE 5729-MS.

Wallis, J.R., *Incomplete Gaussian Elimination for Preconditioning of Generalized Conjugate Gradient Acceleration*, SPE 12265-MS, Proceedings of the 1983 Reservoir Simulation Symposium.

Wallis, J.R., Kendall, R.P., Little, T.E., *Constrained Residual Acceleration of Conjugate Residual Methods*, paper SPE 13536, presented at the 8$^{th}$ SPE Symposium on Reservoir Simulation, Dallas, TX, Feb. 10-13, 1985.

Watts-III, J.W., *A Conjugate Gradient Truncated Direct Method for the Iterative Solution of the Reservoir Pressure Equation*, SPE 8252-PA, Society of Petroleum Engineer Journal, 21:345-353, 1981.

\* cited by examiner

SYSTEM AND METHOD FOR PERFORMING RESERVOIR SIMULATION USING PRECONDITIONING

CROSS-REFERENCE TO RELATED APPLICATIONS

The present application for patent claims the benefit of U.S. Provisional Application bearing Ser. No. 61/446,333, filed on 24 Feb. 2011, which is incorporated by reference in its entirety.

TECHNICAL FIELD

The present invention generally relates to a method, system and processor readable medium containing computer readable software instructions for solving linear systems of equations, such as fully implicit or adaptive implicit matrix systems, arising in reservoir simulation, and more particularly to using a SWIFT (Strong-Weak Incomplete Factorization with Thresholds) preconditioner for solving the linear systems of equations.

BACKGROUND

Reservoir simulation is widely used in the petroleum industry to analyze and forecast the behavior of fluid flow in hydrocarbon bearing subterranean reservoirs, such as gas or oil fields. For instance, simulation inputs can be varied for a reservoir model to project how certain changes might influence a reservoir's future performance. The simulation results are typically used for making reservoir management decisions, such as whether to develop new reservoir fields or how to efficiently manage production of current fields. Developing accurate and more computationally efficient methods for use in reservoir simulators has become increasingly important in the petroleum industry.

In general, reservoir simulation involves the numerical solution of a system of equations that describes the physics governing the complex behaviors of multi-component, multiphase fluid flow in the naturally porous media of a subterranean reservoir. The system of the equations is typically in the form of coupled nonlinear partial differential equations (PDE's). The PDE's are discretized in time and space on a given grid, and discrete equations are solved, such as by an iterative process, for a series of time steps until a prescribed time is reached. At each time step, linearization of the nonlinear system of equations (e.g., Jacobian construction), solving the linear system, and computing a subsequent system of equations is performed. A display representing the fluid flow in the reservoir being modeled can be generated using the simulation results at each time step.

For example, a grid (structured or unstructured) can be imposed upon an area of interest in a reservoir model to define a plurality of cells, each having one or more unknown properties associated therewith. Examples of unknown properties can include, but are not limited to, fluid properties such as pressure, temperature or water saturation, and rock properties such as permeability or porosity. A matrix can be constructed to represent the gridded region of interest and to solve for the unknown variables. For a grid of m cells and $k_i$ unknowns per cell i, i=1, . . . m, giving a total of n unknowns, the linear system $$Ax=b \qquad \text{Equation (1)}$$

is obtained by discretization of the partial differential equations describing flow within the reservoir and wells. Here, A is a known square n×n matrix, x is an n-dimensional vector of the variables representing unknown properties of the cells to be found by solving the system of equations, and b is an n-dimensional vector of known quantities. Block vector x and block vector b are the same length. If a fully implicit time discretization is used, the matrix will generally be constant block-size. If adaptive implicit (AIM) time-stepping is used, such as IMPSAT (implicit pressure and saturation) or IMPES (implicit pressure explicit saturation), the matrix can be variable block-size.

The unknowns are typically ordered cell by cell. Matrix A can be partitioned by cells yielding the blocked matrix $$A=[a_{ij}]_{i,j=1,\ldots,m} \qquad \text{Equation (2)}$$

The nonzero $a_{ij}$ sub-matrices correspond to the cell neighbors of cell i determined by the finite difference stencil and the block $a_{ij}$ is $k_i \times k_j$ for i, j=1, . . . , m.

The solution of the linear system of equations n be a very computationally-intensive task. Generally, linear solvers utilize either direct methods or iterative methods to determine the solution. In the direct method, Gaussian elimination is used such that matrix A is factorized into a product of lower triangular matrix, L, and upper triangular matrix, U. Accordingly, A=LU in the direct method. However, for large sparse matrices, computation of triangular matrices L and U becomes prohibitively expensive as the number of non-zero elements in each factor is very large. In iterative methods, the linear system is solved using approximations to matrix A. For example, an incomplete lower-upper (ILU) factorization can be used, instead of a full factorization as in the direct method. Here, a product of sparse factors L and U are computed such that their product approximates matrix A (A≈LU). When employing an iterative method, the solution is updated repetitively until convergence is reached. Unfortunately, standard iterative methods converge very slowly for large systems of linear equations because the number of iterations typically increases as the number of unknowns increases.

Preconditioning can be used to decrease the number of iterations used by the iterative method when solving the linear system. In preconditioning, matrix A of Equation (1) is multiplied by a preconditioning matrix, often called a "preconditioner" for brevity, such that the linear system is more suitable for numerical solution. For example, matrix A can be transformed into a right preconditioned system, given as $AM^{-1}Mx=b$, or a left preconditioned system, given as $M^1(Ax-b)=0$. Here $M^1$ represents an inverse of preconditioning matrix M. In either case, the preconditioner can be used to increase the rate of convergence when solving Equation (1) since the number of iterations typically grows more slowly, or not at all, with the size of the problem (i.e., the number of unknowns).

Single or multi-stage preconditioners ($AM^{-1}$ or $M^{-1}A$) are frequently combined with Krylov subspace methods for solving the fully implicit or adaptive implicit systems of equations. Examples of well-known iterative procedures used to accelerate convergence in a Krylov subspace include GMRES, which is taught by Y. Saad and M. H. Schultz in "GMRES: A Generalized Minimal Residual Algorithm for Solving Non-symmetric Linear Systems," *SIAM J Sci. Stat. Comp.*, 7(3): 856-869, 1986. One skilled in the art will appreciate that other Krylov subspace methods and algorithms can also be used to accelerate domain decompositions such as the Flexible Generalized Minimal Residual Algorithm (FG-MRES) taught by Y. Saad in "A Flexible Inner-Outer Preconditioned GMRES Algorithm," *SIAM J. Sci. Stat. Comp.*, 14(2): 461-469, 1993; the Orthogonal Minimization (ORTHOMIN) algorithm as taught by P. K. W. Vinsome in "Orthomin, an Iterative Method for Solving Sparse Sets of Simultaneous Linear Equations," which was presented at the SPE Symposium on Numerical Simulation of Reservoir Performance, Feb. 19-20, 1976 in Los Angeles, Calif.; the Bi-Conjugate Gradient Stabilized (Bi-CGSTAB) algorithm as taught by H. A. van der Vorst in "Bi-CGSTAB: A Fast and Smoothly Converging Variant of Bi-CG for the Solution of Nonsymmetric Linear Systems," *SIAM J. Sci. Stat. Comp.*, 13(2): 631-644, 1992; and the Generalized Conjugate Residual (GCR) algorithm as taught by S. C. Eisenstat, H. C. Elman, and M. H. Schultz in "Variational Iterative Methods for Nonsymmetric Systems of Linear Equations," *SIAM Journal of Numerical Analysis*, 20(2) 345-357, 1983.

A commonly used preconditioner in reservoir simulation is the Constrained Pressure Residual (CPR) preconditioner, which is taught by John R. Wallis in "Incomplete Gaussian Elimination for Preconditioning of Generalized Conjugate Gradient Acceleration," which was presented at the SPE Reservoir Simulation Symposium, Nov. 15-18, 1983 in San Francisco, Calif. (SPE 12265). The CPR preconditioner exploits the characteristics of pressure being elliptic (or substantially elliptic) and a "stiff" variable by constructing a two-stage preconditioner comprising a first stage pressure matrix $A_{pp}=W^{T}AC$ and second stage implicit preconditioning matrix M.

$$M_{CPR}^{-1}=M^{-1}[I-ACA_{pp}^{-1}W^{T}]+CA_{pp}^{-1}W^{T} \quad \text{Equation (3)}$$

Here, $W^T$ is an m×n restrictor matrix and C is an n×m in interpolation matrix. Examples of methods used to determine these matrices include implicit pressure explicit saturation (IMPES) formulations, such as True-IMPES and Quasi-IMPES. Additional details on IMPES reduction methods can be found in U.S. Pat. No. 7,516,056. Such methods approximately decouple the pressure variables from the non-pressure variables. The pressure solutions in CPR are usually accomplished by one or more steps of preconditioned GMRES, FGMRES, ORTHOMIN, BICGSTAB, or simply one preconditioning step. Examples of pressure preconditioners include Algebraic Multi-Grid (AMG) methods, and incomplete lower-upper (ILU) triangular factorizations including ILU (k), ILUT(τ), and ILUT(p,τ) factorizations. The value k denotes the level of infill allowed for ILU(k). The value τ denotes the infill drop tolerance. Similarly in ILUT(p,τ) only the p largest magnitude elements in the L part of each row are kept, which are also greater than the drop tolerance. The same criterion is applied to each row of U and the diagonal element is always kept. Accordingly, ILUT (incomplete lower-upper with threshold) factorization computes the entire row of the ~L and ~U matrices, and maintains values greater than a predetermined threshold such that the amount of fill-in is controlled during factorization by dropping entries smaller than a prescribed threshold.

The CPR method is very effective in improving convergence over standard single-stage ILU(k) and ILUT methods. The second stage preconditioning of the CPR method is typically ILU(k) on the multi-variable per cell block matrix where the value of k is zero (0) for easy problems and one (1) for more difficult problems. However, the implementation of block ILU(k) does not exploit sparsity within the sub-matrix blocks and does not use the magnitude of the infill terms to adaptively modify the factorization sparsity pattern to improve accuracy. The ILUT methods are typically used for unblocked matrices, and are useful in addressing accuracy by its adaptive sparsity pattern. However, they typically cannot be applied directly to highly non-symmetric fully implicit or adaptive implicit matrices without using pivoting, which is typically computationally expensive.

While the above methods can be used in linear solvers, a robust and computationally efficient method is needed for solving linear systems of equations that avoids the aforementioned shortcomings, particularly when being applied to large scale reservoir simulation problems. Moreover, any new method should also produce excellent convergence rates.

SUMMARY

A method for solving linear systems of equations arising in reservoir simulation is disclosed. The method comprises providing a linear system of fluid flow equations that represents fluid flow properties in a geological formation of a subterranean reservoir. The linear system of fluid flow equations comprises a plurality of unknown variables. Block diagonal scaling is applied to the linear system of fluid flow equations to obtain a block diagonal matrix. Threshold incomplete lower-upper approximate factorization is applied to the block diagonal matrix to obtain a preconditioning matrix. The linear system of fluid flow equations is iteratively solved for the unknown variables using the preconditioning matrix.

A system for solving linear systems of equations arising in reservoir simulation is also disclosed. The system comprises a database, a computer processor, and a software program executable on the computer processor. The database is configured to store data comprising a linear system of fluid flow equations that represents fluid flow properties in a geological formation of a subterranean reservoir. The linear system of fluid flow equations comprises a plurality of unknown variables. The computer processor is configured to receive the stored data from the database, and to execute software instructions using the stored data. The software program contains computer readable software instructions comprising a block diagonal scaling module, a factorization module, and an iterative solver module. The block diagonal scaling module is configured to apply block diagonal scaling to the linear system of fluid flow equations to obtain a block diagonal matrix. The factorization module is configured to apply threshold incomplete lower-upper approximate factorization to the block diagonal matrix to obtain a preconditioning matrix. The iterative solver module is configured to iteratively solve the linear system of fluid flow equations for the unknown variables using the preconditioning matrix.

A non-transitory processor readable medium containing computer readable software instructions used for solving linear systems of equations arising in reservoir simulation is also disclosed. The software instructions comprise a block diagonal scaling module, a factorization module, and an iterative solver module. The block diagonal scaling module is configured to apply block diagonal scaling to the linear system of fluid flow equations to obtain a block diagonal matrix. The factorization module is configured to apply threshold incomplete lower-upper approximate factorization to the block diagonal matrix to obtain a preconditioning matrix. The iterative solver module is configured to iteratively solve the linear system of fluid flow equations for the unknown variables using the preconditioning matrix.

Terms in the block diagonal matrix can be dropped if the terms are below a predetermined threshold. Equilibration or matrix ordering can be applied prior to applying threshold incomplete lower-upper approximate factorization to the block diagonal matrix. For example, one or more of Sinkhorn-Knipp Column-Row equilibration, Sinkhorn-Knopp Row-Column equilibration, Ruiz Row-Column equilibration, Row-Column Diagonal Dominance variable ordering, Total Infill variable ordering, Reverse Cuthill-McKee cell ordering, or red-black cell ordering can be applied. Threshold incomplete lower-upper approximate factorization can thus be applied without pivoting.

The preconditioning matrix comprises a strong-weak incomplete factorization with at least one threshold. The preconditioning matrix can be used directly in a preconditioned Krylov subspace method or for second stage preconditioning in a constrained pressure residual preconditioning method. The solution to the linear system of fluid flow equations can be used to solve a production optimization problem, to solve a history-matching problem, or to adjust a well parameter in a reservoir field.

BRIEF DESCRIPTION OF THE DRAWINGS

FIG. 1 illustrates a method for reservoir simulation using precondition in

DETAILED DESCRIPTION

Embodiments of the present invention relate to preconditioners for the solution of matrices arising from reservoir simulation equations. In particular, a SWIFT (Strong-Weak Incomplete Factorization with Threshold) preconditioner is disclosed for efficiently solving large scale reservoir simulation problems including highly non-symmetric fully implicit or adaptive implicit matrices. In one embodiment, a SWIFT ($\tau$) (Strong-Weak Incomplete Factorization with a single Threshold) preconditioner is utilized. In one embodiment, a SWIFT(p,$\tau$) (Strong-Weak Incomplete Factorization with dual Thresholds) preconditioner is utilized. As used herein, "strong" refers to variables that are strongly dependent on each other and "weak" refers to variables that are weakly dependent on each other. Several algebraic measures of strength (RCDD and Total Infill) can be defined on the equilibrated matrix and ordering the row-column pairs of this matrix in increasing order of the associated variables' strength has a significant effect on reducing work in the ILUT factorization.

As will be described, SWIFT preconditioners exploit the sparsity within the sub-matrix and use the magnitude of the infill terms to adaptively modify the factorization sparsity pattern to improve accuracy. They can also be used as the second stage of CPR preconditioning or by itself without a first stage. SWIFT preconditioning which is cost effective and avoids pivoting with conventional ILUT factorizations, applies block diagonal scaling to obtain block diagonal matrices.

Block Diagonal Scaling

Block diagonal scaling can be performed according to the following process:

Set $\tilde{A} = b\text{diag}(A)^{-1}A$ where  Equation (4)

$$b\text{diag}(A) = \begin{bmatrix} a_{11} & & & \\ & a_{22} & & \\ & & \ddots & \\ & & & a_{mm} \end{bmatrix}$$  Equation (5)

Since the matrix is block diagonally dominant this scaling typically produces many very small magnitude terms that can be discarded prior to or during the use of ILUT factorization, which enhances the sparsity of the factorization. Block diagonal scaling further allows for a simple algebraic determination of strong or key variables. In some embodiments, block diagonal scaling is followed by equilibration.

Equilibration

Row-column (or column-row) equilibration is used to scale both the rows and columns to possess approximately the same norm (e.g., a value of 1). Row-column equilibration is fast and amenable to parallelization. Examples of row-column equilibration include generalized Sinkhorn-Knopp Column-Row (SKCR), Sinkhorn-Knopp Row-Column (SKRC), and Ruiz Row-Column equilibration. According to an embodiment of the present invention, row-column equilibration can be performed according to the following process:

Set $\hat{A} = \tilde{A}$  Equation (6)

Define the scalar entries of $\hat{A}$ by $\hat{A} = [\hat{a}_{ij}]_{i,j=1,\ldots,n}$  Equation (7)

The generalized Sinkhorn-Knopp Column-Row (SKCR) Equilibration algorithm can be written as follows:

| | |
|---|---|
| $D_C = I$ | Equation (8) |
| $D_R = I$ | Equation (9) |
| For l = 1, ... ,lmax | |
| $f_j = \|\hat{A}_{*,j}\|^{-1}$  i = 1,...,n | Equation (10) |
| $\hat{A} = \hat{A} * \text{diag}(f)$ | Equation (11) |
| $D_C = D_C * \text{diag}(f)$ | Equation (12) |
| $d_i = \|\hat{A}_{i,*}\|^{-1}$  i = 1,...,n | Equation (13) |
| $\hat{A} = \text{diag}(d) * \hat{A}$ | Equation (14) |
| $D_R = D_R * \text{diag}(d)$ | Equation (15) |
| End | |

The Sinkhorn-Knopp Row-Column (SKRC) variation results if Equations (13)-(14) are interchanged with Equations (10)-(12). Additional details on SKCR and SKRC are taught by P. A. Knight in "The Sinkhorn-Knopp Algorithm: Convergence and Applications," *SIAM J. Matrix Analysis and Applications*, 30(1), 2008.

The Ruiz Row-Column Equilibration algorithm can be written as follows:

| | |
|---|---|
| $D_C = 1$ | Equation (16) |
| $D_R = 1$ | Equation (17) |
| For l = 1, . . . , l max | |
| $f_i = \|A_{*,i}\|^{-\frac{1}{2}}$  i = 1, ... , n | Equation (18) |
| $d_i = \|A_{i,*}\|^{-\frac{1}{2}}$  i = 1, ... , n | Equation (19) |
| $\hat{A} = \text{diag}(d) * \hat{A} * \text{diag}(f)$ | Equation (20) |
| $D_C = D_C * \text{diag}(f)$ | Equation (21) |
| $D_R = D_R * \text{diag}(d)$ | Equation (22) |
| End | |

Additional details on Ruiz Row-Column Equilibration are taught by D. Ruiz in "A scaling algorithm to equilibrate both row and column norms in matrices," Tech. Rep. RAL-TR-2001-034, Rutherford Appleton Laboratory, 2001.

In the above row-column equilibration examples, l max is typically set to a value of 2 and a 1-norm is utilized. However, other values of l max and other matrix norms can be implemented. The following is obtained from row-column equilibration:

$\hat{A} = D_R \tilde{A} D_C$  Equation (23)

Block diagonal scaling and matrix equilibration thus result in sparser factorizations, allowing for ILUT factorization without pivoting due to the block diagonal dominance of A. The following procedures, according to some embodiments of the present invention, can also be performed to further reduce the size of factorizations.

Dropping of Small Magnitude Matrix Terms

According to an embodiment of the present invention, small magnitude terms in matrix Â may be optionally dropped if $$|â_{ij}| \leq \gamma \quad i,j=1,\ldots,n \qquad \text{Equation (24)}$$

where $\gamma>0$ is a pre-specified or pre-determined parameter. For example, in one embodiment, $\gamma=0.005$. In another embodiment, $\gamma=0.010$.

Matrix Ordering

In some embodiments, matrix ordering is applied prior to factorization. As will be described below, examples of matrix ordering include cell ordering and variable ordering. Matrix ordering can have a significant impact in lowering the number of non-zeros in the factorization.

Cell Ordering

In some embodiments, cell ordering is applied cell by cell. One advantage of cell ordering is that it needs to be determined only once prior to the first matrix factorization. Each cell's variables can be ordered consecutively. An example of cell ordering is Reverse Cuthill-McKee (RCM) ordering, additional details of which are taught by J. A. George in "A Survey of Sparse Matrix Methods in the Direct Solution of Finite Element Equations," Proc. Summer Computer Simulation Conf., Montreal, Canada, Jul. 17-19, 1973, pp. 15-20 and by E. Cuthill in "Several Strategies for Reducing the Bandwidth of Matrices," Sparse Matrices and their Applications, D. J. Rose and R. A. Willoughby, eds., Plenum Press, New York, 1972, pp. 157-166. Another example of cell ordering is red-black ordering, it has been used by many researchers, such as N. Guessous and O. Souhar in "The Effect of Block Red-Black Ordering on Block ILU Preconditioner for Sparse Matrices" J. Appl. Math. & Computing Vol. 17 (2005), No. 1-2, pp. 283-296 and by Takeshi Iwashita and Masaaki Shimasaki in "Block Red-Black Ordering: A New Ordering Strategy for Parallelization of ICCG Method," International Journal of Parallel Programming, Vol. 31, Issue 1, February 2003.

Variable Ordering

In some embodiments, the rows and columns of the matrix are ordered in ascending or descending order of diagonal dominance of the associated pivot. This can have a significant impact in lowering the number of non-zeros in ILUT factorization for non-symmetric matrices. This is similar to, but different from, the diagonal dominance measure of:

$$\theta_i = \frac{|â_{ii}|}{\sum_j |â_{ii}|} \qquad \text{Equation (25)}$$

$$i = 1, \ldots, n$$

that is taught by Y. Saad in "Multilevel ILU with reorderings for diagonal dominance," SIAM J. Sci. Comput., 27 (2006), pp. 1032-1057. One disadvantage of variable ordering is that it needs to be determined prior to each matrix factorization. Row-Column Diagonal Dominance (RCDD) and Total Infill (TINF) are examples of variable ordering.

Row-Column Diagonal Dominance (RCDD) Matrix Ordering

RCDD matrix ordering can be performed according to the following process:

Order rows and columns of $\hat{A}=[\hat{a}_{ij}]_{i,j=1,\ldots,n}$ by decreasing magnitude of the RCDD diagonal dominance measure $\theta_i$ of pivot where $$\theta_i = \frac{|â_{ii}|}{\min\left(\sum_j |â_{ii}|, \sum_j |â_{ii}|\right)} \qquad \text{Equation (26)}$$

$$i = 1, \ldots, n$$

The corresponding permutation matrix is P. Then $$B = P^T \hat{A} P \qquad \text{Equation (27)}$$

Total Infill (TINF) Matrix Ordering

TINF matrix ordering can be performed according to the following process:

Order rows acid columns of $\hat{A}=[\hat{a}_{ij}]_{i,j=1,\ldots,n}$ by increasing magnitude of "total infill" $w_i$ of pivot i where $$w_i = \frac{\sum_{j \neq i} |â_{ii}|, \sum_{j \neq i} |â_{ii}|}{|â_{ii}|} \qquad \text{Equation (28)}$$

$$i = 1, \ldots, n$$

The corresponding permutation matrix is P. Then $$B = P^T \hat{A} P \qquad \text{Equation (29)}$$

The $w_i$, $i=1, \ldots, n$ represent an approximation to the total magnitude of infill generated from using pivot i to eliminate the remaining terms in column i. Here, pivots producing the least amount of infill are ordered first to minimize their effect on increasing infill associated with later pivots.

The difference between the two ordering methods is the measure of diagonal dominance. However, both methods reorder the rows and columns of the matrix, which decreases the size of the incomplete factorization and increases its accuracy, thus reducing the computational work performed by the computer.

Approximate Factorization

Approximate factorization can be performed to block diagonal matrix B to obtain a preconditioning matrix. For example, threshold incomplete lower-upper approximate factorization can be performed according to the following process:

Factor block diagonal matrix B using ILUT($\tau$) or ILUT(p, $\tau$) obtaining:

$$LU \approx B \qquad \text{Equation (30)}$$

where L is a lower triangular matrix and U is an upper triangular matrix.

As previously discussed, the value $\tau$ denotes the infill drop tolerance, which typically ranges between $0.01 \leq \tau \leq 0.0001$. For example, in one embodiment, $\tau=0.001$. In another embodiment, $\tau=0.005$. Similarly in ILUT(p,$\tau$), only the p largest magnitude elements in the L part and the U part of each row are kept, which are also greater than the drop tolerance. For example, in one embodiment the value of p typically ranges between $10 \leq p \leq 50$, although the value of p can be much higher. In one embodiment, p=30. In another embodiment, p=40. In another embodiment, p is determined based on p=factor*max($NNZ_i$) where $i=1, \ldots, n$. Here, $NNZ_i$ is the number of non-zeros for row i of the original matrix. The factor has a value greater than or equal to 2. For example, in difficult problems, the value of factor can be set to 3 or 4.

Additional details on ILUT factorization are taught by Yousef Sand in "Iterative Methods for Sparse Linear Systems," PWS Publishing Company, 1996, Chapter 10—Preconditioning Techniques and "ILUT: a dual threshold incomplete ILU factorization," Numerical Linear Algebra with Applications, pages 387-402, 1994.

Iterative Solution

According to an embodiment of the present invention, an iterative solution can then be found for the unknown variables in the system of equations. As previously discussed, various iterative procedures (e.g., GMRES, FGMRES, ORTHOMIN, or Bi-CGSTAB) can be used to accelerate convergence of the solution.

In one example, the following is performed:
Solve $\tilde{A}x=r$ with $r=bdiag(A)^{-1}b$
with preconditioning $$M_{CPR}^{-1} = D_C P U^{-1} L^{-1} P^T D_R [I - \tilde{A} C A_{pp}^{-1} \tilde{W}^T] + C A_{pp}^{-1} \tilde{W}^T \quad \text{Equation (31)}$$

where $$\tilde{W}^T = W^T bdiag(A) \quad \text{Equation (32)}$$

In another example, the following is performed:
Solve $\hat{A}y=r$ with $r=D_R bdiag(A)^{-1}b$
with preconditioning $$M_{CPR}^{-1} = P U^{-1} L^{-1} P^T [I - \hat{A} \hat{C} A_{pp}^{-1} \hat{W}^T] + \hat{C} A_{pp}^{-1} \hat{W}^T \quad \text{Equation (33)}$$

where $$\hat{W}^T = W^T bdiag(A) D_R^{-1} \quad \text{Equation (34)}$$

$$\hat{C} = D_C^{-1} C \quad \text{Equation (35)}$$

Set $$x = D_C y \quad \text{Equation (36)}$$

Parallel Algorithm

The above methods can be adapted for shared-memory and distributed memory systems by using block-Jacobi preconditioning for each domain. In one embodiment, block-diagonal scaling, equilibration, matrix reordering (RCCD or TINF) and approximate factorization are applied to the local matrix within the domains. Accordingly, it is not necessary to perform these steps, such as equilibration, globally.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed or parallel computing environments where tasks are performed by servers or other processing devices that are linked through one or more data communications networks. For example, the large computational problems arising in reservoir simulation can be broken down into smaller ones such that they can be solved concurrently—or in parallel. In particular, the system can include a cluster of several stand-alone computers. Each stand-alone computer can comprise a single core or multiple core microprocessors that are networked through a hub and switch to a controller computer and network server. An optimal number of individual processors can then be selected for a given problem based on factors such as reservoir partitioning where the reservoir grid cells are divided into domains that are assigned to the individual processors.

As will be described, the invention can be implemented in numerous ways, including, for example, as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore, are not to be considered limiting of its scope and breadth.

Figure 1:
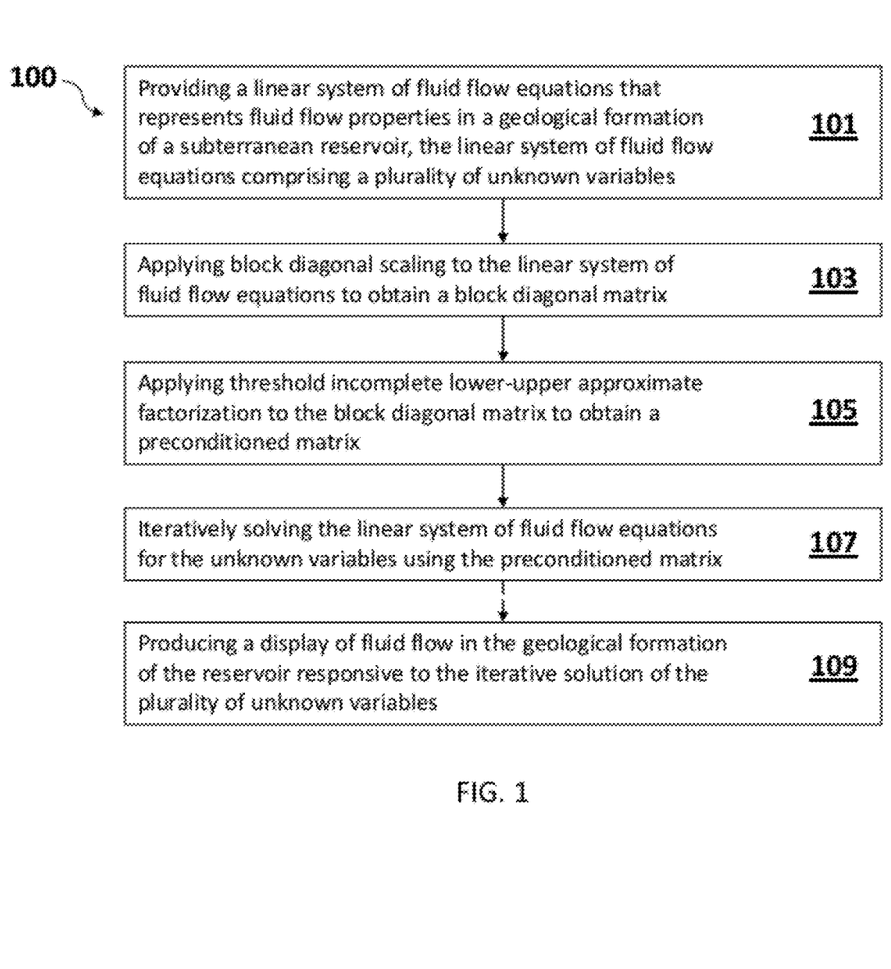

FIG. 1 illustrates a flow diagram showing computer-implemented method 100 for simulating fluid flow in a subterranean reservoir, according to an embodiment of the present invention. In step 101, a matrix associated with a system of fluid flow equations is provided. The system of fluid flow equations represents fluid flow properties in a geological formation of a subterranean reservoir and includes a plurality of unknown variables. For example, the system of fluid flow equations can be written in the form of Equation (1), where x is a vector of the plurality of unknown variables and A is the matrix provided in step 101. Block diagonal scaling is applied to the matrix in step 103 to obtain a block diagonal matrix. For example, block diagonal scaling can be performed according to Equations (4) and (5). In step 105, approximate factorization, such as threshold incomplete lower-upper factorization, is applied to the block diagonal matrix to obtain a preconditioning matrix. For example, approximate factorization can be performed according to Equation (30). The plurality of unknown variables is iteratively solved in step 107 using the preconditioning matrix. For example, the iterative solution can be obtained using Equations (31)-(32), or (33)-(36). Accordingly, preconditioning can be used directly as part of a preconditioned Krylov subspace method or alternatively as a $2^{nd}$ stage preconditioner in a CPR algorithm.

In some embodiments, method 100 can include matrix equilibration prior to the factorization in step 105. For example row-column or column-row equilibration can be performed using Equations (6)-(15), or (16)-(22). In some embodiments, method 100 can include matrix ordering, such as RCDD (via Equations (26)-(27)) or TINF (via Equations (28)-(29)), prior to the factorization. As previously described, RCDD and TINF order the rows and columns of a non-symmetric matrix to reduce the size of the factorization, such as ILUT factorization, thereby improving its efficiency. Method 100 can also order the cells prior to the factorization, such as by using RCM or red-black ordering.

In some embodiments, a display of the fluid flow in the geological formation of the subterranean reservoir is produced responsive to the iterative solution for the plurality of unknown variables in step 109. For example, this information can include cumulative fluid injection amounts, fluid injection rates, cumulative fluid production amounts, fluid production rates, bottom hole pressure (BHP) profiles for injectors and producers, and the net present value (NPV) of an optimized case. This information can be utilized to forecast or optimize the production performance of the subterranean reservoir, which can then be used for reservoir management decisions.

Figure 2:
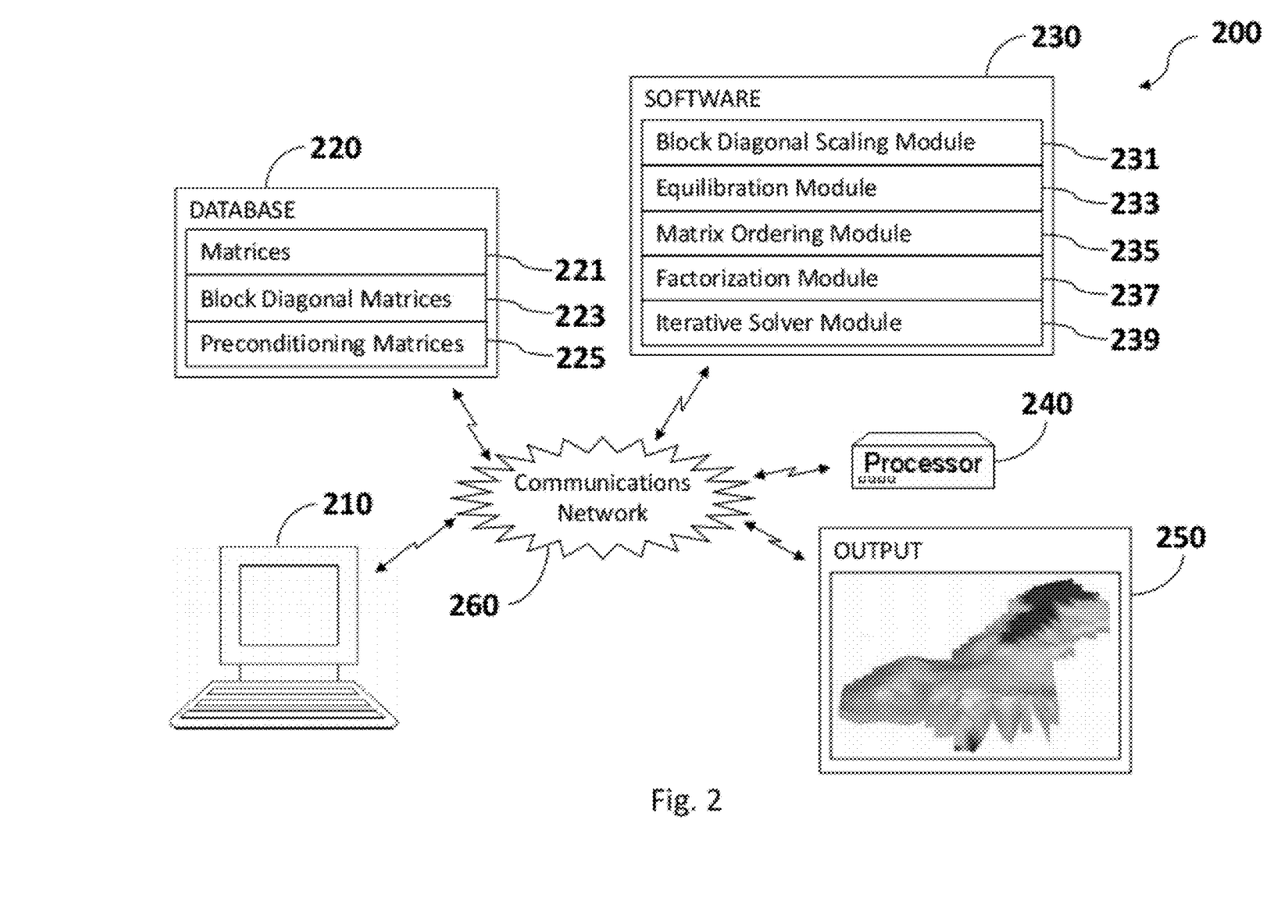
FIG. 2 illustrates a system for reservoir simulation using preconditioning.

FIG. 2 illustrates a system 200 for simulating fluid flow in a subterranean reservoir, such as by implementing computer-implemented method 100. System 200 includes user interface 210, such that an operator can actively input information and review operations of system 200. User interface 210 can be any means in which a person is capable of interacting with system 200 such as a keyboard, mouse, or touch-screen display. Operator-entered data input into system 200 through user interface 210 can be stored in database 220. Additionally, any information generated by system 200 can be stored in database 220. Matrices 221, Block Diagonal Matrices 223, and Preconditioning Matrices 225 are all examples of information that can be stored in database 220. The matrices 221, 223, 225 are associated with a system of fluid flow equations representing fluid flow properties in a geological formation of a subterranean reservoir and are used to solve a plurality of unknown variables that represent properties of the subterranean reservoir.

System 200 includes software instructions or computer program 230 that is stored on a non-transitory computer usable or processor readable medium. Current examples of such non-transitory medium include, but are not limited to, read-only memory (ROM) devices, random access memory (RAM) devices, and semiconductor-based memory devices. This includes flash memory devices, programmable ROM (PROM) devices, erasable programmable ROM (EPROM) devices, electrically erasable programmable ROM (EEPROM) devices, dynamic RAM (DRAM) devices, static RAM (SRAM) devices, magnetic storage devices (e.g., floppy disks, hard disks), optical disks (e.g., compact disks (CD-ROMs)), and integrated circuits. Non-transitory medium can be transportable such that the one or more computer programs (i.e., a plurality of software instructions) stored thereon can be loaded onto a computer resource such that when executed on the one or more computers or processors, performs the aforementioned functions of the various embodiments of the present invention.

System 200 includes one or more modules and/or is in communication with one or more devices (e.g., a linear solver) configured to perform any step of any of the methods (e.g., method 100) described herein. Processor 240 interprets instructions to execute software 230 and generates automatic instructions to execute software for system 200 responsive to predetermined conditions. Instructions from both user interface 210 and software 230 are processed by processor 240 for operation of system 200. In some embodiments, a plurality of processors can be utilized such that system operations can be executed more rapidly.

Examples of modules for software 230 can include, but are not limited to, block diagonal scaling module 231, equilibration module 233, matrix ordering module 235, factorization module 237, and iterative solver module 239. Block diagonal scaling module 231 is utilized to scale the diagonal blocks of the original matrix A (i.e., in Equation (1)) to the identity matrix. For example, block diagonal scaling module can be configured to utilize Equations (4) and (5) for such operations. Block diagonal scaling module can also be configured to drop small magnitude matrix terms (e.g. Equation (24)), If preconditioning includes equilibration (e.g., SKRC, SKCR, Ruiz Row-Column equilibration) or ordering (e.g., RCDD, TINF), equilibration module 233 or matrix ordering module 235 can be used, respectively. For example, equilibration module 233 can be configured to utilize Equations (8)-(15) or (16)-(22). Matrix ordering module 235 can be configured to utilize Equations (26)-(27) or (28)-(29). Matrix ordering can also perform cell ordering (e.g., RCM ordering, red-black ordering). Factorization module 237 is configured to obtain a preconditioning matrix using approximate factorization, such as threshold incomplete lower-upper factorization. For example, factorization module 237 can be configured to utilize Equation (30). Iterative solver module 239 is used to iteratively solve a linear system of fluid flow equations for a plurality of unknown variables using a preconditioning matrix. For example, iterative solver module can be configured to obtain an iterative solution using Equations (31)-(32), or Equations (33)-(36).

In certain embodiments, system 200 can include reporting unit 250 to provide information, such as a display of fluid flow in a geological formation of the reservoir, to the operator or to other systems (not shown). For example, reporting unit 250 can be a printer, display screen, or a data storage device. However, it should be understood that system 200 need not include reporting unit 250, and alternatively user interface 210 can be utilized for reporting information of system 200 to the operator.

Communication between any components of system 200, such as user interface 210, database 220, software 230, processor 240 and reporting unit 250, can be transferred over a communications network 260. Computer system 200 can be linked or connected to other, remote computer systems (e.g., a forward simulation module) via communications network 260. Communications network 260 can be any means that allows for information transfer to facilitate sharing of knowledge and resources, and can utilize any communications protocol such as the Transmission Control Protocol/Internet Protocol (TCP/IP). Examples of communications network 260 include, but are not limited to, personal area networks (PANs), local area networks (LANs), wide area networks (WANs), campus area networks (LANs), and virtual private networks (VPNs). Communications network 260 can also include any hardware technology or equipment used to connect individual devices in the network, such as by wired technologies (e.g., twisted pair cables, co-axial cables, optical cables) or wireless technologies (e.g., radio waves).

In operation, an operator initiates software 230, through user interface 210, to perform the methods described herein. Accordingly, software 230 can utilize the software modules to iteratively solve a linear system of equations, including large scale reservoir simulation problems, using preconditioning, while producing excellent convergence rates. Outputs from each software module, such as block diagonal scaling module 231, equilibration module 233, ordering module 235, factorization module 237, and iterative solver module 239, can be stored in database 220.

A visual display can be produced, such as through reporting unit 250 or user interface 210, using the outputs of software 230. For example, the solution to the unknown variables can be transformed into image data representations for display to a user or operator. Alternatively, outputs from software 230 can be sent to other systems (not shown). The output information can be utilized to forecast or optimize the production performance of the subterranean reservoir, which can then be used for reservoir management decisions. For example, output from system 200 can include cumulative fluid injection amounts, fluid injection rates, cumulative fluid production amounts, fluid production rates, bottom hole pressure (BHP) profiles for injectors and producers, and the net present value (NPV) of an optimized case.

EXAMPLES

The above described methods and systems are applied to a wide range of matrices that were generated from reservoir simulation models, including thermal (SAGD or steamflood), black oil, and compositional models. A summary of the models are below:

1) Model 1, thermal SAGD, m=4158, neq=4, nwells=4, rtol=1.E-5
2) Model 2, thermal SAGD, m=4158, neq=4, nwells=4, rtol=1.E-5
3) Model 3, thermal SAGD, m=21560, neq=4, nwells=4, rtol=1.E-5
4) Model 4, thermal steamflood, m=1863, neq=5, nwells=5, rtol=1.E-5
5) Model 5, black oil, m=4300, neq=3, nwells=5, rtol=1.E-5
6) Model 6, compositional, m=200, neq=12, nwells=1, rtol=1.E-5
7) Model 7, thermal steamflood, m=4000, neq=4, nwells=6, rtol=1E-5
8) Model 8, thermal steamflood, m=4000, neq=4, nwells=6, rtol=1E-5
9) Model 9, thermal SAGD, m=21560, neq=4, nwells=4, rtol=1.E-5
10) Model 10, thermal steamflood, m=4000, neq=4, nwells=6, rtol=1E-5

The following table provides a further description of notation used in these examples:

| | |
|---|---|
| m | Number of cells per model |
| neq | Number of equations per grid cell (i.e., number of primary variables per grid cell) |
| nwells | Number of wells per model |
| rtol | FGMRES convergence criterion: residual 2-norm reduction ratio |
| Precond method | Preconditioning method utilized. |
| Equil meth | Equilibrium method utilized. |
| Equil itns | Row-Column equilibration iterations on $\tilde{A}$. |
| Matrix ordering | Matrix ordering method utilized. |
| $1^{st}$ Stage | CPR pressure preconditioning method. |
| $2^{nd}$ Stage | CPR implicit preconditioning method. |
| FGMRES iterations | Flexible Generalized Minimal Residual Algorithm iterations. |
| p-m ratio | The number of non-zeros of $2^{nd}$ stage factorization divided by the number of non-zeros of a fully implicit matrix with sub-matrix blocks. This can be used to compare the preconditioning methods to typical implementations of block ILU(k) methods. |
| CPR | Constrained Pressure Residual |
| BILU(k) | Block Incomplete Lower Upper factorization where k represents the level of infill allowed |
| SWIFT($\tau$) | Strong-Weak Incomplete Factorization with Threshold where $\tau$ represents one threshold |
| SKRC | Sinkhorn-Knopp Row-Column equilibration (1-norm) |
| SKCR | Sinkhorn-Knopp Column-Row equilibration (1-norm) |
| Original | Cell by cell ordering in natural order of cells |
| RCDD | Row-Column Diagonal Dominance matrix ordering |
| TINF | Total Infill matrix ordering |
| RCM | Reverse Cuthill-McKee matrix ordering by cell |
| AMG | 1 Algebraic Multi-Grid v-cycle step |

| Model 1 (SAGD) | | | | | | | |
|---|---|---|---|---|---|---|---|
| Precond method | Equil meth | Equil itns | Matrix ordering | $2^{nd}$ stage | p-m ratio | $1^{st}$ stage | FGMRES iterations |
| CPR | None | 0 | original | BILU(0) | 1.00 | AMG | 28 |
| CPR | None | 0 | original | BILU(1) | 1.79 | AMG | 16 |
| CPR | SKCR | 2 | RCDD | SWIFT(.005) | 0.41 | AMG | 8 |
| CPR | SKCR | 2 | RCM | SWIFT(.005) | 0.43 | AMG | 7 |
| CPR | SKCR | 2 | original | SWIFT(.005) | 0.45 | AMG | 8 |
| SWIFT(.005) | SKCR | 2 | RCM | None | 0.43 | None | 6 |

The best result for Model 1 was SWIFT(0.005), which is 41% the size of BILU(0). SWIFT(0.005) took 6 versus 28 FGMRES iterations for BILU(0). Furthermore, SWIFT (0.005) is 23% the size of BILU(1). In particular, SWIFT (0.005) took 6 versus 16 FGMRES iterations for BILU(1).

| Model 2 (SAGD) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 5 |
| CPR | None | 0 | original | BILU(1) | 1.79 | AMG | 4 |
| CPR | SKCR | 2 | RCDD | SWIFT(.005) | 0.26 | AMG | 3 |
| CPR | SKCR | 2 | RCM | SWIFT(.005) | 0.28 | AMG | 3 |

-continued

| Model 2 (SAGD) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | SKCR | 2 | original | SWIFT(.005) | 0.28 | AMG | 3 |
| SWIFT(.005) | SKCR | 2 | RCM | None | 0.28 | None | 4 |

The best result for Model 2 was $2^{nd}$ stage SWIFT (0.005), which is 26% size of BILU(0). $2^{nd}$ stage SWIFT(0.005) took 3 versus 5 FGMRES iterations for BILU(0). Furthermore, $2^{nd}$ stage SWIFT(0.005) is 15% the size of BILU(1). In particular, SWIFT(0.005) took 3 versus 4 FGMRES iterations for BILU(1).

| Model 3 (SAGD) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 20 |
| CPR | None | 0 | original | BILU(1) | 1.81 | AMG | 15 |
| BILU(1) | None | 0 | original | None | 1.81 | None | 16 |
| CPR | SKCR | 2 | RCDD | SWIFT(.005) | 0.22 | AMG | 10 |
| CPR | SKCR | 2 | TINF | SWIFT(.005) | 0.22 | AMG | 8 |
| CPR | SKCR | 2 | original | SWIFT(.005) | 0.23 | AMG | 10 |
| CPR | SKCR | 2 | RCM | SWIFT(.005) | 0.23 | AMG | 10 |
| SWIFT(.005) | SKCR | 2 | RCM | None | 0.23 | None | 5 |
| SWIFT(.005) | SKCR | 2 | original | None | 0.23 | None | 7 |

The best result for Model 3 was SWIFT(0.005), which is 23% the size of BILU(0). SWIFT(0.005) took 5 versus 20 FGMRES iterations for BILU(0). Furthermore, SWIFT (0.005) is 13% the size of BILU(1). In particular, SWIFT (0.005) took 5 versus 15 FGMRES iterations for BILU(1).

| Model 4 (Steamflood) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 11 |
| CPR | None | 0 | original | BILU(1) | 1.77 | AMG | 8 |
| CPR | SKRC | 2 | RCDD | SWIFT(.005) | 0.30 | AMG | 6 |
| CPR | SKRC | 2 | RCM | SWIFT(.005) | 0.38 | AMG | 6 |
| CPR | SKRC | 2 | original | SWIFT(.005) | 0.36 | AMG | 6 |
| SWIFT(.005) | SKRC | 2 | RCM | None | 0.38 | None | 9 |

The best result for Model 4 was $2^{nd}$ stage SWIFT(0.005), which is 30% the size of BILU(0). $2^{nd}$ stage SWIFT(0.005) took 6 versus 11 FGMRES iterations for BILU(0). Furthermore, $2^{nd}$ stage SWIFT(0.005) is 17% the size of BILU(1). In particular, $2^{nd}$ stage SWIFT(0.005) took 6 versus 8 FGMRES iterations for BILU(1).

| Model 5 (Black oil) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 9 |
| CPR | None | 0 | original | BILU(1) | 1.78 | AMG | 8 |
| CPR | SKCR | 2 | RCDD | SWIFT(.005) | 0.48 | AMG | 7 |
| CPR | SKCR | 2 | RCM | SWIFT(.005) | 0.61 | AMG | 7 |
| CPR | SKCR | 2 | original | SWIFT(.005) | 0.64 | AMG | 7 |
| SWIFT(.005) | SKCR | 2 | RCM | None | 0.64 | None | 26 |

The best result for Model 5 was $2^{nd}$ stage SWIFT(0.005), which is 48% the size of BILU(0). $2^{nd}$ stage SWIFT(0.005) took 7 versus 9 FGMRES iterations for BILU(0). Furthermore, $2^{nd}$ stage SWIFT(0.005) is 27% the size of BILU(1). In particular, $2^{nd}$ stage SWIFT(0.005) took 7 versus 8 FGMRES iterations for BILU(1).

| Model 6 (Compositional) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 7 |
| CPR | None | 0 | original | BILU(1) | 1.36 | AMG | 7 |
| CPR | SKRC | 2 | RCDD | SWIFT(.005) | 0.11 | AMG | 6 |
| CPR | SKRC | 2 | RCM | SWIFT(.005) | 0.12 | AMG | 5 |
| CPR | SKRC | 2 | original | SWIFT(.005) | 0.12 | AMG | 5 |
| SWIFT(.005) | SKCR | 2 | Original | None | 0.12 | AMG | 9 |
| SWIFT(.005) | SKCR | 2 | RCM | None | 0.12 | AMG | 10 |

The best result for Model 6 was $2^{nd}$ stage SWIFT(0.005), which is 12% the size of BILU(0). $2^{nd}$ stage SWIFT(0.005) took 5 versus 7 FGMRES iterations for BILU(0). Furthermore, $2^{nd}$ stage SWIFT(0.005) is 9% the size of BILU(1). In particular, $2^{nd}$ stage SWIFT(0.005) took 5 versus 7 FGMRES iterations for BILU(1).

| Model 7 (Steamflood) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 17 |
| CPR | None | 0 | original | BILU(1) | 1.79 | AMG | 14 |
| CPR | SKCR | 2 | RCDD | SWIFT(.005) | 0.51 | AMG | 7 |
| CPR | SKCR | 2 | RCM | SWIFT(.005) | 0.57 | AMG | 7 |
| CPR | SKCR | 2 | original | SWIFT(.005) | 0.63 | AMG | 9 |
| SWIFT(.005) | SKCR | 2 | RCM | None | 0.57 | None | 10 |

The best result for Model 7 was $2^{nd}$ stage SWIFT(0.005), which is 51% the size of BILU(0). $2^{nd}$ stage SWIFT(0.005) took 7 versus 17 FGMRES iterations for BILU(0). Furthermore, $2^{nd}$ stage SWIFT(0.005) is 28% the size of BILU(1). In particular, $2^{nd}$ stage SWIFT(0.005) took 7 versus 14 FGMRES iterations for BILU(1).

| Model 8 (Steamflood) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 43 |
| CPR | None | 0 | original | BILU(1) | 1.79 | AMG | 33 |
| CPR | SKCR | 2 | RCDD | SWIFT(.005) | 0.89 | AMG | 16 |
| CPR | SKCR | 2 | RCM | SWIFT(.005) | 0.96 | AMG | 16 |
| CPR | SKCR | 2 | original | SWIFT(.005) | 1.00 | AMG | 17 |
| SWIFT(.005) | SKCR | 2 | RCM | None | 0.96 | None | 15 |

The best result for Model 8 was SWIFT(0.005), which is 96% the size of BILU(0). SWIFT(0.005) took 15 versus 43 FGMRES iterations for BILU(9), Furthermore, SWIFT(0.005) is 54% the size of BILU(1). In particular, SWIFT(0.005) took 15 versus 33 FGMRES iterations for BILU(1).

| Model 9 (SAGD) | | | | | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 36 |
| CPR | None | 0 | original | BILU(1) | 1.81 | AMG | 29 |

| | | | | Model 9 (SAGD) | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| BILU(1) | None | 0 | original | None | 1.81 | None | 22 |
| CPR | SKCR | 2 | RCDD | SWIFT(.005) | 0.32 | AMG | 12 |
| CPR | SKCR | 2 | TINF | SWIFT(.005) | 0.32 | AMG | 11 |
| CPR | SKCR | 2 | RCM | SWIFT(.005) | 0.35 | AMG | 11 |
| CPR | SKCR | 2 | original | SWIFT(.005) | 0.36 | AMG | 13 |
| SWIFT(.005) | SKCR | 2 | RCM | None | 0.35 | None | 7 |
| SWIFT(.005) | SKCR | 2 | original | None | 0.36 | None | 9 |

The best result for Model 9 was SWIFT(0.005), which is 32% the size of BILU(0). SWIFT(0.005) took 7 versus 36 FGMRES iterations for BILU(0). Furthermore, SWIFT (0.005) is 18% the size of BILU(1). In particular, SWIFT (0.005) took 7 versus 29 FGMRES iterations for BILU(1).

| | | | | Model 10 (Steamflood) | | | |
|---|---|---|---|---|---|---|---|
| Precond method | Equil meth | Equil itns | Matrix ordering | $2^{nd}$ stage | p-m ratio | $1^{st}$ stage precond | FGMRES iterations |
| CPR | None | 0 | original | BILU(0) | 1.00 | AMG | 22 |
| CPR | None | 0 | original | BILU(1) | 1.79 | AMG | 17 |
| CPR | SKRC | 2 | RCDD | SWIFT(.005) | 1.40 | AMG | 12 |
| CPR | SKRC | 2 | RCM | SWIFT(.005) | 1.41 | AMG | 11 |
| CPR | SKRC | 2 | original | SWIFT(.005) | 1.44 | AMG | 15 |
| SWIFT(.005) | SKRC | 2 | RCM | SWIFT(.005) | 1.41 | AMG | 8 |

The best result for Model 10 was SWIFT(0.005), which is 141% the size of BILU(0). SWIFT(0.005) took 8 versus 22 FGMRES iterations for BILU(0). Furthermore, SWIFT (0.005) is 79% the size of BILU(1). In particular, SWIFT (0.005) took 8 versus 17 FGMRES iterations for BILU(1).

As demonstrated by these examples, the CPR/SWIFT method was able to improve the convergence rate and reduce the $2^{nd}$ stage preconditioning work counts for the models tested.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited elements) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

All references cited herein are incorporated by reference in their entirety.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, additional methods and examples are provided in the following pages.

What is claimed is:

1. A computer-implemented method for solving linear systems of equations arising in reservoir simulation, the method comprising:
    (a) providing a linear system of fluid flow equations that represents fluid flow properties in a geological formation of a subterranean reservoir, the linear system of fluid flow equations comprising a plurality of unknown variables;
    (b) applying, with a processor, block diagonal scaling to the linear system of fluid flow equations to obtain a block diagonal matrix;
    (c) applying at least one of Sinkhorn-Knopp Column-Row equilibration, Sinkhorn-Knopp Row-Column equilibration, or Ruiz Row-Column equilibration;
    (d) applying threshold incomplete lower-upper approximate factorization to the block diagonal matrix to obtain a preconditioning matrix; and
    (e) iteratively solving the linear system of fluid flow equations for the unknown variables using the preconditioning matrix.

2. The method of claim 1, wherein terms in the block diagonal matrix are dropped if the terms are below a predetermined threshold.

3. The method of claim 1, wherein Row-Column Diagonal Dominance variable ordering is applied prior to step (d).

4. The method of claim 1, wherein Total Infill variable ordering is applied prior to step (d).

5. The method of claim 1, wherein Reverse Cuthill-McKee or red-black cell ordering is applied prior to step (d).

6. The method of claim 1, wherein the threshold incomplete lower-upper approximate factorization is applied without pivoting.

7. The method of claim 1, wherein the preconditioning matrix comprises a strong-weak incomplete factorization with at least one threshold.

8. The method of claim 1, wherein the preconditioning matrix is used directly in a preconditioned Krylov subspace method.

9. The method of claim 1, wherein the preconditioning matrix is used for second stage preconditioning in a constrained pressure residual preconditioning method.

10. The method of claim 1, wherein:
the linear system of fluid flow equations is represented in step (e) as $\tilde{A}x=r$ with $r=\text{bdiag}(A)^{-1}b$; and
the preconditioning matrix is represented as $$M_{CPR}^{-1}=D_C PU^{-1}L^{-1}P^T D_R[I-\tilde{A}CA_{pp}^{-1}\tilde{W}^T]+CA_{pp}^{-1}\tilde{W}^T$$

where $$\tilde{W}^T = W^T b\text{diag}(A).$$

11. The method of claim 1, wherein:
the linear system of fluid flow equations is represented in step (e) as $\hat{A}y=r$ with $r=D_R \text{bdiag}(A)^{-1}b$; and
the preconditioning matrix is represented as $$M_{CPR}^{-1}=PU^{-1}L^{-1}P^T[I-\hat{A}\hat{C}A_{pp}^{-1}\hat{W}^T]+\hat{C}A_{pp}^{-1}\hat{W}^T$$

where $\hat{W}^T = W^T b\text{diag}(A)D_R^{-1}.$

12. The method of claim 1, wherein the solution to the linear system of fluid flow equations is used to solve one of a production optimization problem, a history-matching problem, or used to adjust a well parameter in a reservoir field.

13. A system for solving linear systems of equations arising in reservoir simulation, the system comprising:
a database configured to store data comprising a linear system of fluid flow equations that represents fluid flow properties in a geological formation of a subterranean reservoir, the linear system of fluid flow equations comprising a plurality of unknown variables;
a computer processor configured to receive the stored data from the database, and to execute software instructions using the stored data; and
a software program executable on the computer processor, wherein the software program, when executed with the computer processor, cause the processor to:
apply block diagonal scaling to the linear system of fluid flow equations to obtain a block diagonal matrix;
apply at least one of Sinkhorn-Knopp Column-Row equilibration, Sinkhorn-Knopp Row-Column equilibration, or Ruiz Row-Column equilibration;
apply threshold incomplete lower-upper approximate factorization to the block diagonal matrix to obtain a preconditioning matrix; and
iteratively solve the linear system of fluid flow equations for the unknown variables using the preconditioning matrix.

14. The system of claim 13, wherein the software program, when executed with the computer processor, cause the processor to apply Row-Column Diagonal Dominance variable ordering.

15. The system of claim 13, wherein the software program, when executed with the computer processor, cause the processor to:
drop terms in the block diagonal matrix if the terms are below a predetermined threshold; and
the apply threshold incomplete lower-upper approximate factorization to the block diagonal matrix without pivoting.

16. A non-transitory processor readable medium containing computer readable software instructions used for solving linear systems of equations arising in reservoir simulation, the software instructions comprising:
applying block diagonal scaling to a linear system of fluid flow equations to obtain a block diagonal matrix;
applying at least one of Sinkhorn-Knopp Column-Row equilibration, Sinkhorn-Knopp Row-Column equilibration, or Ruiz Row-Column equilibration;
applying threshold incomplete lower-upper approximate factorization to the block diagonal matrix to obtain a preconditioning matrix; and
iteratively solving the linear system of fluid flow equations for the unknown variables using the preconditioning matrix.

17. The non-transitory processor readable medium of claim 13, wherein the software instructions further comprising:
applying at least one of Row-Column Diagonal Dominance variable ordering, Total Infill variable ordering, Reverse Cuthill-McKee cell ordering, or red-black cell ordering.

18. The system of claim 13, wherein the software program, when executed with the computer processor, cause the processor to apply Total Infill variable ordering.

19. The system of claim 13, wherein the software program, when executed with the computer processor, cause the processor to apply Reverse Cuthill-McKee cell ordering.

20. The system of claim 13, wherein the software program, when executed with the computer processor, cause the processor to apply red-black cell ordering.

* * * * *

UNITED STATES PATENT AND TRADEMARK OFFICE
CERTIFICATE OF CORRECTION

PATENT NO. : 8,903,694 B2  
APPLICATION NO. : 13/404072  
DATED : December 2, 2014  
INVENTOR(S) : John R. Wallis et al.

Page 1 of 1

It is certified that error appears in the above-identified patent and that said Letters Patent is hereby corrected as shown below:

ON THE TITLE PAGE

Please add the following Assignee:

Name of Assignee:
TOTAL SA

RESIDENCE (CITY and STATE OR COUNTRY):
Courbevoie, France

Signed and Sealed this
First Day of December, 2015

Michelle K. Lee
*Director of the United States Patent and Trademark Office*